United States Patent
Chae

(10) Patent No.: US 6,819,368 B2
(45) Date of Patent: Nov. 16, 2004

(54) ARRAY SUBSTRATE OF A LIQUID CRYSTAL DISPLAY AND METHOD OF FABRICATING THE SAME

(75) Inventor: Gee Sung Chae, Incheon-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 45 days.

(21) Appl. No.: 10/176,779

(22) Filed: Jun. 24, 2002

(65) Prior Publication Data

US 2002/0196383 A1 Dec. 26, 2002

(30) Foreign Application Priority Data

Jun. 25, 2001 (KR) ........................................ 2001-36211

(51) Int. Cl.$^7$ ............................................ G02F 1/1343
(52) U.S. Cl. ........................ 349/38; 349/39; 349/143; 349/147
(58) Field of Search ............................ 349/38, 39, 143, 349/147, 107

(56) References Cited

U.S. PATENT DOCUMENTS

| | | | |
|---|---|---|---|
| 5,852,485 A | * 12/1998 | Shimada et al. | 349/141 |
| 6,115,099 A | * 9/2000 | Yamamoto et al. | 349/178 |
| 6,433,764 B1 | * 8/2002 | Hebiguchi et al. | 345/87 |
| 2001/0002857 A1 | * 6/2001 | Shmada et al. | 349/138 |
| 2002/0180673 A1 | * 12/2002 | Tsuda et al. | 345/87 |
| 2003/0058377 A1 | * 3/2003 | Chae et al. | 349/43 |
| 2003/0107039 A1 | * 6/2003 | Jung et al. | 257/72 |
| 2003/0164917 A1 | * 9/2003 | Ohta et al. | 349/141 |
| 2003/0168688 A1 | * 9/2003 | Ohtani et al. | 257/300 |

FOREIGN PATENT DOCUMENTS

| KR | 1019980017723 A | 6/1998 |
|---|---|---|
| KR | 1019980021018 A | 6/1998 |

\* cited by examiner

*Primary Examiner*—Tarifur R. Chowdhury
*Assistant Examiner*—Mike Qi
(74) *Attorney, Agent, or Firm*—McKenna Long & Aldridge LLP

(57) ABSTRACT

An array substrate of a liquid crystal display and a fabricating method thereof. In the array substrate, a gate wire and a common wire are provided on the substrate. A gate electrode is protruded from the gate wire. A gate insulating film is formed in such a manner to cover the gate wire and the gate electrode. A source electrode is provided on a semiconductor layer and a gate insulating film and is connected to a data wire. A drain electrode is provided on the semiconductor layer and the gate insulating film and is opposed to the source electrode. A protective layer covers the gate and data wires and the source and drain electrodes, and has a contact hole for exposing the drain electrode. A pixel electrode is connected, via the contact hole, to the drain electrode. Herein, the drain electrode is extended within a pixel to overlap with the common wire having the gate insulating film therebetween.

18 Claims, 4 Drawing Sheets

ARRAY SUBSTRATE OF A LIQUID CRYSTAL DISPLAY AND METHOD OF FABRICATING THE SAME

This application claims the benefit of Korean Patent Application No. 2001-36211, filed on Jun. 25, 2001, which is hereby incorporated by reference for all purposes as if fully set forth herein.

BACKGROUND OF THE INVENTION

1. Field of the Invention

The present invention relates to a liquid crystal display, and more particularly to an array substrate of a liquid crystal display that is adaptive for improving an aperture ratio of a high-definition liquid crystal display. The present invention also is directed to a method of fabricating the array substrate of the liquid crystal display.

2. Description of the Related Art

Generally, a liquid crystal display (LCD) of an active matrix driving system uses thin film transistors (TFTs) as switching devices to display a natural moving picture. Since such an LCD can be made into a smaller device in size than the existing Brown tube, LCDs have been widely used in monitors for personal computers or notebook computers as well as office automation equipment such as copy machines, etc. and portable equipment such as a cellular phones and a pagers, etc.

Such a liquid crystal display includes liquid crystal injected between a lower substrate provided with switching devices each consisting of a gate electrode, a gate insulating film, an active layer, an ohmic contact layer, source and drain electrodes, pixel electrodes, and an upper substrate provided with color filters.

Referring to FIG. 1, an array substrate of the conventional liquid crystal display is divided into a transistor area T1 and a storage capacitor area C1.

The transistor area T1 is provided with a TFT consisting of a gate electrode 13, a gate insulating film 17 (shown in FIG. 2), an active layer 19 (shown in FIG. 2), an ohmic contact layer 21 (shown in FIG. 2) and source and drain electrodes 23 and 25. The drain electrode 25 of the TFT electrically contacts a pixel electrode 35 via a first contact hole 31.

The storage capacitor area C1 is positioned at the center of the pixel, and is provided with a common wire 15 formed at the lower portion thereof having the gate insulating film 17 (shown in FIG. 2) therebetween and a storage electrode 27 formed at the upper portion thereof. In this case, the storage electrode 27 is connected to the pixel electrode 35 via a second contact hole 33 in a passivation layer 29 (shown in FIG. 2) formed thereon. A storage capacitor Cst (shown in FIG. 2) is provided between the common wire 15, which is a lower electrode, and the storage capacitor 27, which is an upper electrode, with the gate insulating film 17 therebetween. This storage capacitor Cst plays a role to improve a sustaining characteristic of a liquid crystal application voltage in a non-selection interval and stabilizes gray scale display.

A method of fabricating such a liquid crystal display will be described with reference to FIG. 2.

First, a gate electrode 13 is formed at the transistor area T1 of the substrate 40, and a common wire 15 is formed at the capacitor area C1 arranged at the middle portion of the pixel. Subsequently, a gate insulating film 17 made from an insulating material such as silicon nitride or silicon oxide is provided to cover the entire surfaces of the gate electrode 13, the common wire 15 and the substrate 40.

Next, an active layer 19 is formed at a portion corresponding to the gate electrode 13 on the gate insulating film 17. An ohmic contact layer 21 is formed at a portion excluding a portion corresponding to the gate electrode 13 at each side of the active layer 19. The active layer 19 is made from amorphous silicon or polycrystalline silicon, which is not doped with an impurity, while the ohmic contact layer 21 is made from amorphous silicon or polycrystalline silicon, which is doped with a n-type or p-type impurity at a high concentration.

Then, source and drain electrodes 23 and 25 are formed at the transistor area T1 on the gate insulating film 17 in such a manner to cover the ohmic contact layer 21. At the same time, a storage electrode 27 is formed at a portion corresponding to the common wire 15 having the gate insulating film 17 therebetween. The source and drain electrodes 23 and 25 and the storage electrode 27 are made from a metal such as molybdenum (Mo), chromium (Cr), or a molybdenum alloy such as MoW, MoTa or MoNb, etc.

Thereafter, a passivation layer 29 is formed on the gate insulating film 17 in such a manner to cover the above-mentioned structure. The passivation layer 29 is made from an inorganic insulating material such as silicon nitride or silicon oxide, etc. and an organic material having a small dielectric constant such as an acrylic organic compound, benzocyclobutene (BCB) or perfluorocyclobutane (PFBC), etc.

A first contact hole 31 for exposing the drain electrode 25 and a second contact hole 33 for exposing the storage electrode 17 are provided in the passivation layer 29. A pixel electrode 35 contacting the drain electrode 25 and the storage electrode 27 via the first and second contact holes 31 and 33 is formed on the passivation layer 29. The pixel electrode 35 is made from a transparent conductive material such as indium-tin-oxide (ITO), tin-oxide (TO) or indium-zinc-oxide (IZO), etc.

An array substrate 40 provided with the transistor area T1 and the storage capacitor area C1 is opposed and joined to an upper substrate provided with black matrices and color filters (not shown) having a liquid crystal therebetween. At this time, since the black matrices cannot control an arrangement of liquid crystal molecules at an area generating a disinclination line in which a liquid crystal alignment is changed discontinuously, the black matrices hide the transistor area T1 and the storage capacitor area C1 including the common wire 15 positioned at the center of the pixel electrode 35. To this end, the black matrices are formed divided into two parts on the transistor area T1 and the storage capacitor area C1 within one pixel in consideration of a joint margin (about 5 $\mu$m) of the upper substrate to the array substrate 40.

Therefore, apertures X and Y (shown in FIG. 1) are largely reduced by the black matrices. As a result, a reduction of the apertures X and Y raises a problem in that it is impossible to cope with a high-definition liquid crystal display having a decreased pixel size.

SUMMARY OF THE INVENTION

Accordingly, the present invention is directed to an array substrate of a liquid crystal display device that substantially obviates one or more problems due to limitations and disadvantages of the related art.

An advantage of the present invention is to provide an array substrate of a liquid crystal display and a fabricating method thereof that is adaptive for improving an aperture ratio of a high-definition liquid crystal display.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, an array substrate of a liquid crystal display according to one aspect of the present invention includes a substrate; a gate wire and a common wire provided on the substrate; a gate electrode protruded from the gate wire; a gate insulating film formed to cover the gate wire and the gate electrode; a semiconductor layer formed on the gate insulating film in correspondence with the gate electrode; a source electrode provided on the semiconductor layer and the gate insulating film and connected to the data wire; a drain electrode provided on the semiconductor layer and the gate insulating film and opposed to the source electrode; a protective layer covering the gate and data wires and the source and drain electrodes and having a contact hole for exposing the drain electrode; a pixel electrode connected, via the contact hole, to the drain electrode, wherein said drain electrode is extended within a pixel to overlap with the common wire with having the gate insulating film therebetween.

In the array substrate, the common wire departs from the center position within the pixel to be adjacent to the thin film transistor.

A method of fabricating an array substrate of a liquid crystal display according to another aspect of the present invention includes forming a gate electrode and a common wire being adjacent to the gate electrode on a substrate; forming a gate insulating film in such a manner to cover the gate wire and the common wire; forming a semiconductor layer on the gate insulating film in correspondence with the gate electrode; forming a source electrode on the semiconductor layer and the gate insulating film and, simultaneously, forming a drain electrode to be opposed to the source electrode and the common wire forming a protective layer covering the source and drain electrodes and having a contact hole for exposing the drain electrode on the gate insulating film; and forming a pixel electrode connected, via the contact hole, to the drain electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
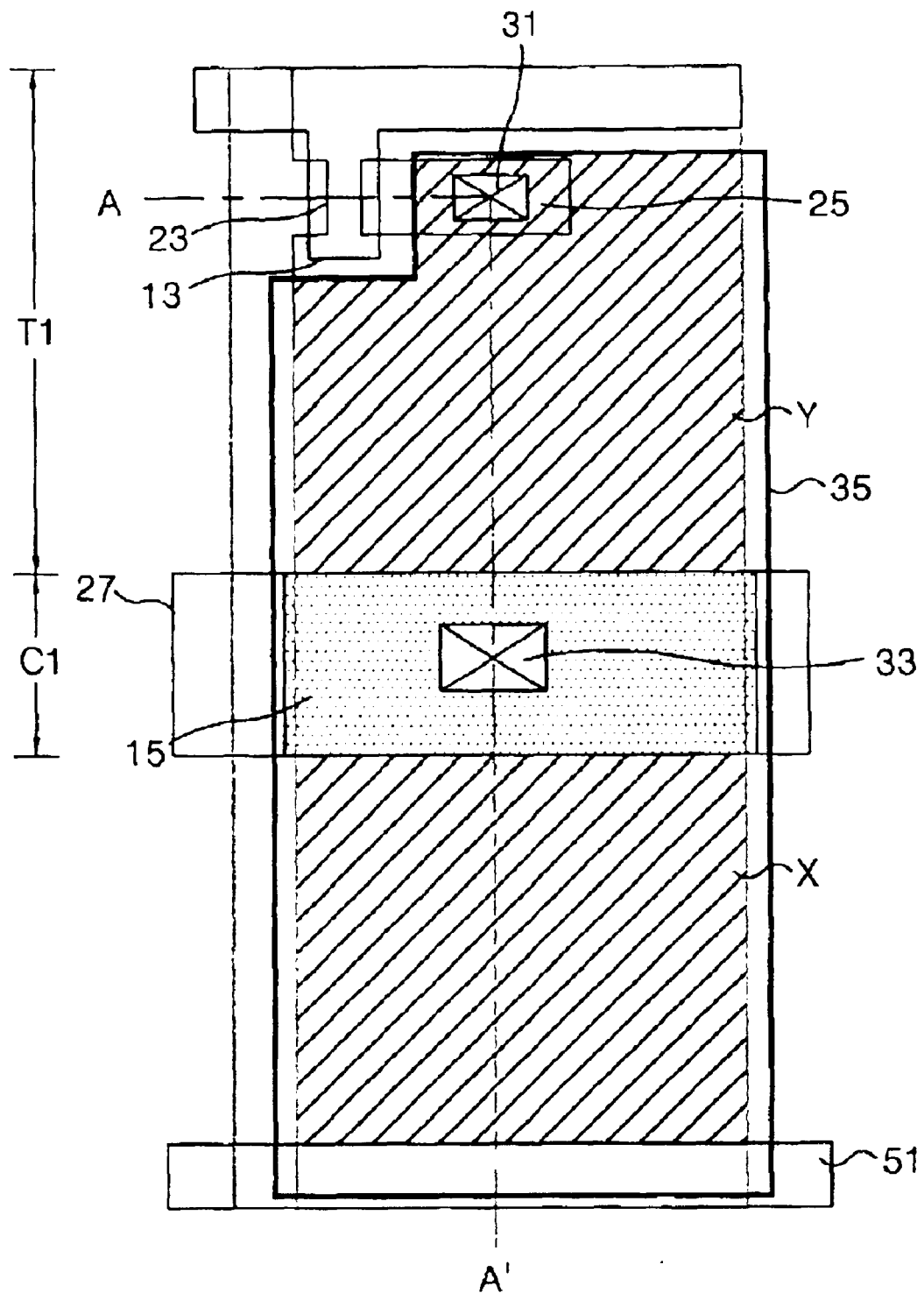
FIG. 1 is a plan view showing a structure of an array substrate of a conventional liquid crystal display.
Figure 2:
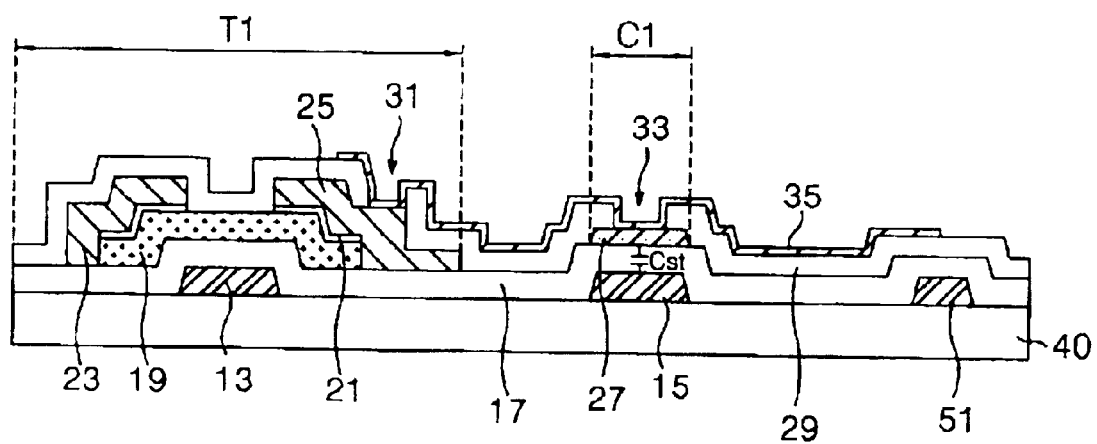
FIG. 2 is a sectional view taken along the A—A' line in FIG. 1.
Figure 3:
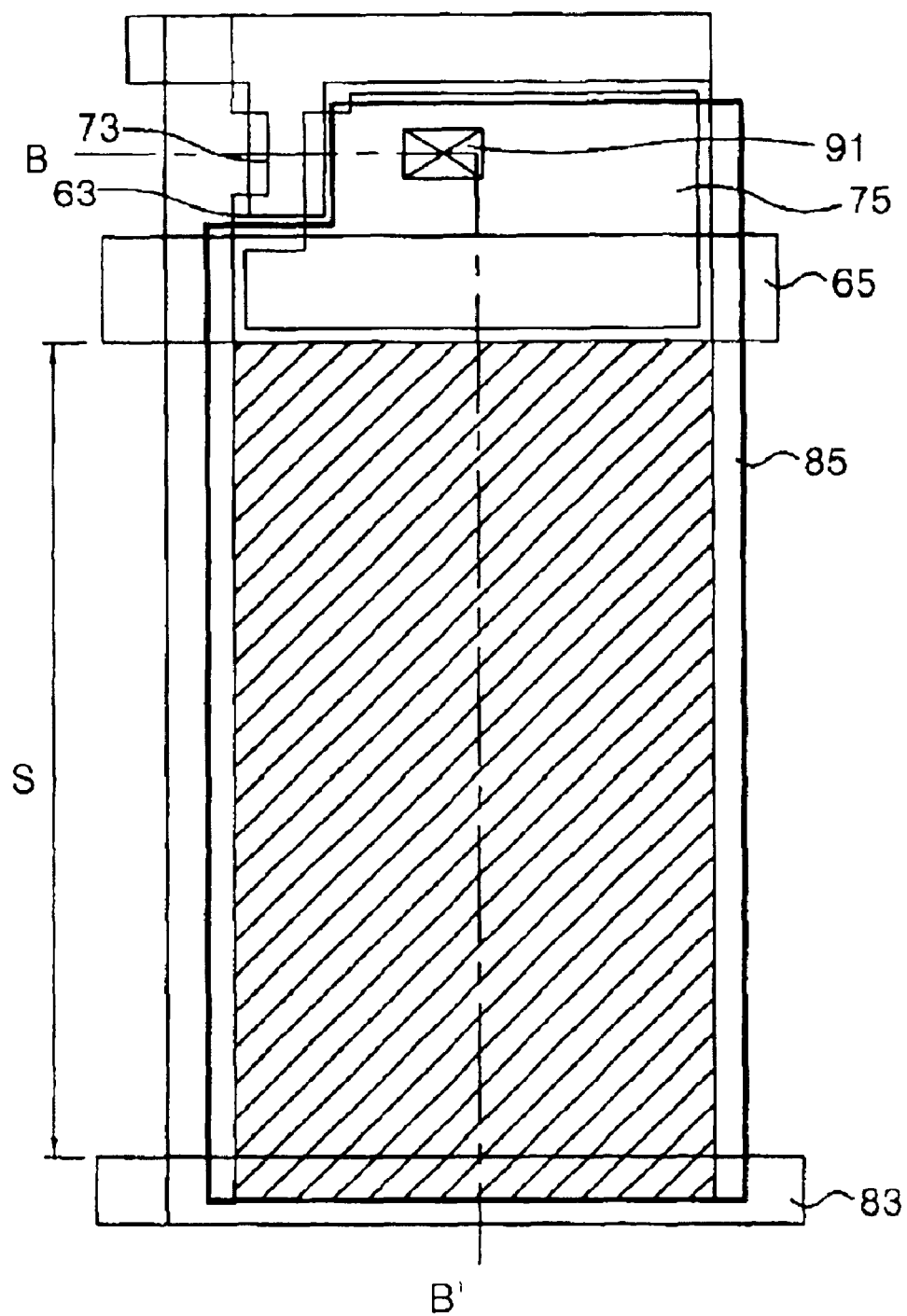
FIG. 3 is a plan view showing a structure of an array substrate of a liquid crystal display according to an embodiment of the present invention.
Figure 4:
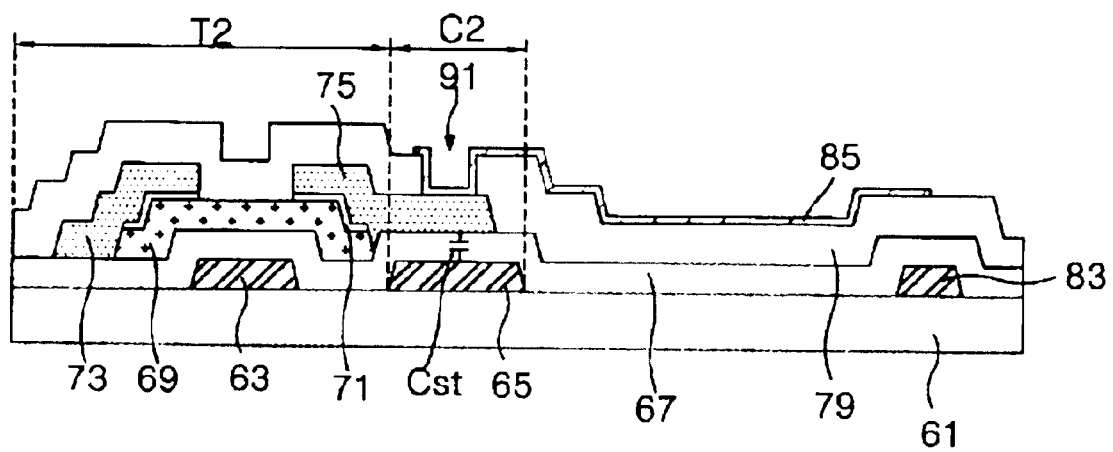
FIG. 4 is a sectional view taken along the B—B' line in FIG. 3.

Referring to FIG. 3 and FIG. 4, an array substrate of a liquid crystal display according to an embodiment of the present invention is divided into a transistor area T2 and a storage capacitor area C2.

The transistor area T2 is provided with a TFT consisting of a gate electrode 63, a gate insulating film 67, an active layer 69, an ohmic contact layer 71 and source and drain electrodes 73 and 75. The drain electrode 75 of the TFT electrically contacts a pixel electrode 85 via a first contact hole 31.

At the storage capacitor area C2, a storage capacitor Cst is provided between a common wire 65, which is a lower electrode formed adjacent to the TFT as much as possible, and the drain electrode 75 of the TFT extended into a pixel area, having the gate insulating film 67 therebetween. This storage capacitor Cst plays a role to improve a sustaining characteristic of a liquid crystal application voltage in a non-selection interval and stabilize a gray scale display. The drain electrode 75 of the TFT is electrically connected, via a contact hole 91, to a pixel electrode 85. The drain electrode 75 also serves as the storage electrode, which is an upper electrode of the storage capacitor Cst.

A method of fabricating such a liquid crystal display will be described with reference to FIG. 4.

First, the gate electrode 63 is formed at the transistor area T2 of the substrate 61, and the common wire 65 is formed at the capacitor area C2 in such a manner that it is further from the center of the pixel than in the prior art and to be close to the transistor area T2 as much as possible. Subsequently, the gate insulating film 67 made from an insulating material such as silicon nitride or silicon oxide is provided to cover the entire surfaces of the gate electrode 63, the common wire 65 and the substrate 61.

Next, the active layer 69 is formed at a portion corresponding to the gate electrode 63 on the gate insulating film 67. The ohmic contact layer 71 is formed at a portion excluding a portion corresponding to the gate electrode 63 at each side of the active layer 69. The active layer 69 is made from amorphous silicon or polycrystalline silicon, which is not doped with an impurity while the ohmic contact layer 71 is made from amorphous silicon or polycrystalline silicon, which is doped with a n-type or p-type impurity at a high concentration.

Then, the source and drain electrodes 73 and 75 are formed at the transistor area T2 on the gate insulating film 67 in such a manner to cover the ohmic contact layer 71. At the same time, the drain electrode 75 is extended toward the pixel in such a manner to be opposed to the common wire 65 having the gate insulating film 67 therebetween. The source and drain electrodes 73 and 75 and the common wire 65 are simultaneously formed from a metal such as molybdenum (Mo) or chromium (Cr), or a molybdenum alloy such as MoW, MoTa or MoNb, etc. Thus, the storage capacitor Cst is provided between the common wire 65, which is a lower electrode and the drain electrode 75, which is an upper electrode, having the gate insulating film 67 therebetween.

Thereafter, the passivation layer 79 is formed on the gate insulating film 67 in such a manner to cover the above-mentioned structure. The passivation layer 79 is made from an inorganic insulating material such as silicon nitride or silicon oxide, etc. and an organic material having a small dielectric constant such as an acrylic organic compound, benzocyclobutene (BCB) or perfluorocyclobutane (PFBC), etc.

A contact hole 91 for exposing the drain electrode 75 is defined in the passivation layer 79. The pixel electrode 85 contacting the drain electrode 75 and the common wire 65 via the contact hole 91 is formed on the passivation layer 79. The pixel electrode 85 is made from a transparent conductive material such as indium-tin-oxide (ITO), tin-oxide (TO) or indium-zinc-oxide (IZO), etc.

A substrate 61 provided with the transistor area T2 and the storage capacitor Cst is opposed and joined to an upper substrate provided with black matrices and color filters (not shown) having a liquid crystal therebetween. At this time, since the black matrices cannot control an arrangement of liquid crystal molecules at an area generating a disinclination line in which a liquid crystal alignment is changed discontinuously, the black matrices hide the transistor area T2 and the capacitor area C2 positioned adjacently to the transistor area T2. To this end, the black matrices are formed into a single part in such a manner to oppositely cover the transistor area T2 and the storage capacitor area C2 within one pixel in consideration of a joint margin (about 5 µm) of the upper substrate to the substrate 61.

Accordingly, while the same size of storage capacitor is formed, an area occupied by the black matrices is reduced and it becomes easy to prevent light leakage. Thus, the entire aperture S (shown in FIG. 3) is largely increased in comparison to the conventional apertures X and Y. In order words, the storage capacitor area C2 positioned at the center of the pixel is arranged adjacently to the transistor area T2 as much as possible, thereby improving an aperture ratio. This arrangement copes with a high-definition liquid crystal display having a reduced pixel size.

As described above, according to the present invention, the common wire of the storage capacitor is provided adjacently to the thin film transistor as much as possible at the center of the pixel area, thereby minimizing an area occupied by the black matrices to improve an aperture ratio.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An array substrate of a liquid crystal display including a thin film transistor having a gate electrode, a source electrode and a drain electrode at each crossing between a plurality of gate wires and a plurality of data wires, said substrate comprising:

a substrate;

a gate wire and a common wire provided on the substrate;

a gate electrode protruded from the gate wire;

a gate insulating film formed to cover the gate wire and the gate electrode;

a semiconductor layer formed on the gate insulating film in correspondence with the gate electrode;

said source electrode provided on the semiconductor layer and the gate insulating film and connected to the data wire;

said drain electrode provided on the semiconductor layer and the gate insulating film and opposed to the source electrode;

a protective layer covering the gate and data wires and the source and drain electrodes and having a contact hole for exposing the drain electrode; and a pixel electrode connected, via the contact hole, to the drain electrode, wherein said drain electrode is extended within a pixel to overlap with the common wire and extended throughout the area between the thin film transistor and the next adjacent data wire with having the gate insulating film therebetween.

2. The array substrate as claimed in claim 1, wherein the common wire departs from the center position within the pixel to be adjacent to the thin film transistor.

3. A method of fabricating an array substrate of a liquid crystal display, comprising:

forming a gate electrode and a common wire being adjacent to the gate electrode on a substrate;

forming a gate insulating film to cover the gate wire and the common wire;

forming a semiconductor layer on the gate insulating film in correspondence with the gate electrode;

forming a source electrode on the semiconductor layer and the gate insulating film and, simultaneously, forming a drain electrode to be opposed to the source electrode and the common wire;

forming a protective layer covering the source and drain electrodes and having a contact hole for exposing the drain electrode on the gate insulating film; and forming a pixel electrode connected, via the contact hole, to the drain electrode wherein said drain electrode is extended within a pixel to overlap with the common wire and extended throughout the area between the thin film transistor and the next adjacent data wire with having the gate insulating film therebetween.

4. Any array substrate of a liquid crystal display, comprising:

a transistor area provided with a thin film transistor (TFT) wherein the TFT includes a gate electrode, a gate insulating film, an active layer, an ohmic contact layer, and source and drain electrodes; and a storage capacitor area including a storage capacitor (Cst) provided between a common wire, which is a lower electrode formed adjacent to the TFT, and a drain electrode of the TFT extended into a pixel area and extended throughout the area between the thin film transistor and the next adjacent data wire, having the gate insulating film therebetween;

wherein the drain electrode of the TFT electronically contacts a pixel electrode via a first contact hole.

5. The array substrate of claim 4, wherein the drain electrode is a storage electrode, which is an upper electrode of the Cst.

6. A method of fabricating a liquid crystal display, comprising:

forming a gate electrode at a transistor area of a substrate;

forming a common wire at a capacitor area such that it is not adjacent to a center of a pixel and is adjacent to the transistor area;

forming a gate insulating film to cover the gate electrode, the common wire and the substrate;

forming an active layer at a position corresponding to the gate electrode on the gate insulating film;

forming an ohmic contact layer at a portion excluding a portion corresponding to the gate electrode at each side of the active layer; and forming source and drain electrodes at the transistor area on the gate insulating film to cover the ohmic contact layer, wherein the drain electrode is extended toward the pixel to be opposed to the common wire and extended throughout the area between the thin film transistor and the next adjacent data wire having the gate insulating film therebetween.

7. The method of claim 6, wherein a storage capacitor (Cst) is provided between the common wire, which is a lower electrode and the drain electrode, which is an upper electrode, having the gate insulating film therebetween.

8. The method of claim 6, further comprising forming a passivation layer on the gate insulating film.

9. The method of claim 8, further comprising forming a contact hole in the passivation layer for exposing the drain electrode.

10. The method of claim 9, further comprising forming a pixel electrode to contact the drain electrode and the common wire via the contact hole in the passivation layer.

11. The method of claim 10, wherein the pixel electrode is one of indium-tin oxide, tin-oxide, and indium-zinc-oxide.

12. The method of claim 8, wherein the passivation layer is made from one of inorganic material and organic material.

13. The method of claim 12, wherein the inorganic material is one of silicon nitride and silicone oxide, and the organic material is one of acrylic organic compound, benzocyclobutene, and perfluorocyclobutane.

14. The method of claim 6, wherein the gate insulating film is made from one of silicon nitride and silicon oxide.

15. The method of claim 6, wherein the active layer is made from one of amorphous silicon and polycrystalline silicon.

16. The method of claim 6, wherein the ohmic contact layer is made from one of amorphous silicon and polycrystalline silicon doped with an impurity at a high concentration.

17. The method of claim 6, wherein the source and drain electrodes and the common wire are simultaneously formed from a metal.

18. The method of claim 17, wherein the metal is one of molybdenum, chromium, and molybdenum alloy.

* * * * *